(No Model.)
A. B. CLIPPINGER.
CORN HARVESTER.
No. 472,916. Patented Apr. 12, 1892.
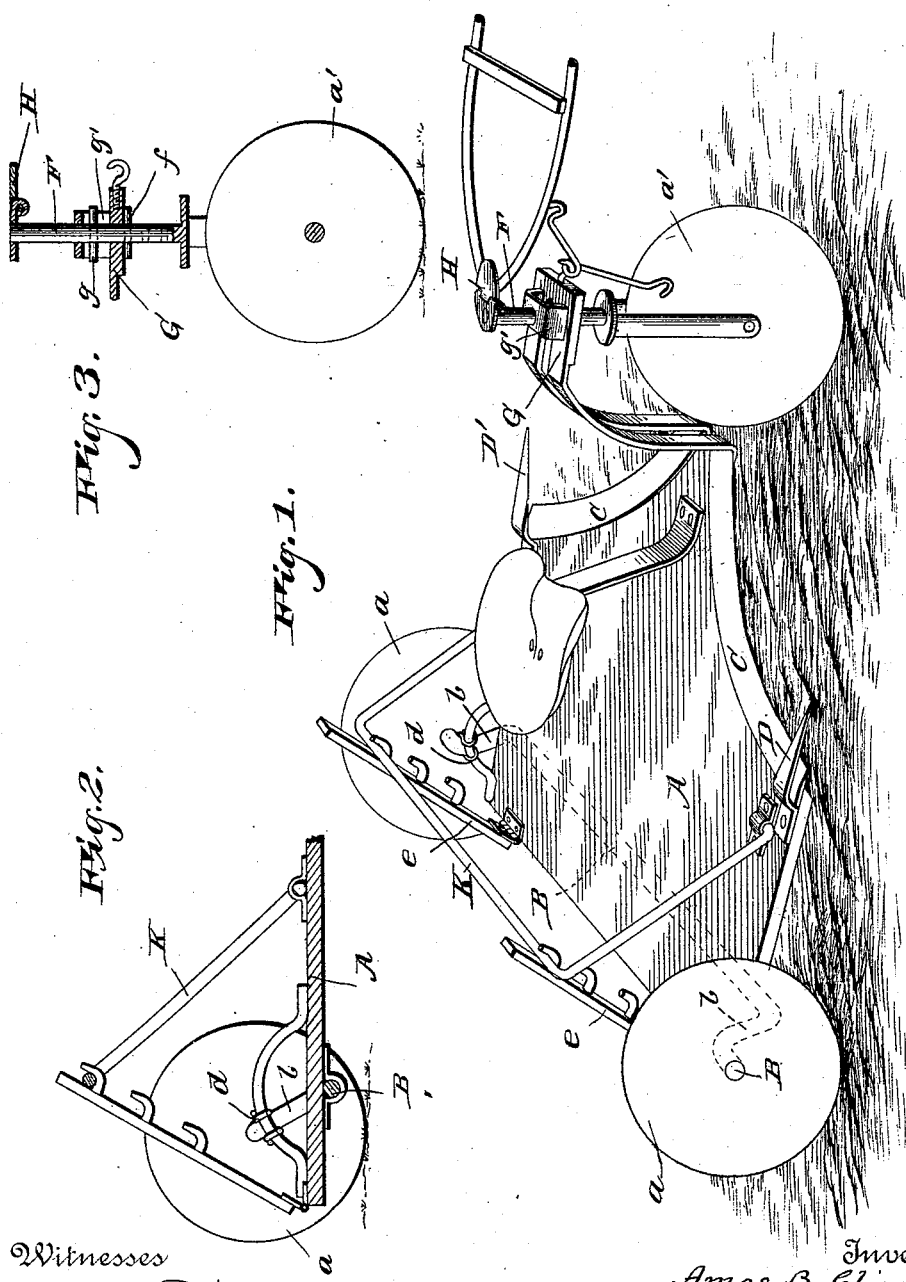

UNITED STATES PATENT OFFICE.

AMOS B. CLIPPINGER, OF CENTRALIA, KANSAS.

CORN-HARVESTER.

SPECIFICATION forming part of Letters Patent No. 472,916, dated April 12, 1892.

Application filed May 29, 1891. Serial No. 394,580. (No model.)

*To all whom it may concern:*

Be it known that I, AMOS B. CLIPPINGER, a citizen of the United States, and a resident of Centralia, in the county of Nemaha and State of Kansas, have invented certain new and useful Improvements in Corn-Harvesters; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view, and Figs. 2 and 3 are sectional detail views.

This invention has relation to certain new and useful improvements in corn cutters and harvesters; and it consists in the novel features thereof, as hereinafter described, and pointed out in the claims.

In the accompanying drawings, illustrating the invention, the letter A designates the platform or frame supported upon the rear wheels $a$ and the forward wheels $a'$. The rear wheels $a$ and their axle B are made adjustable with relation to the platform to support the platform at the desired height, and this may be done in the manner shown or in any other suitable way.

In the drawings I have shown the axle mounted in bearings on the under side of the frame and provided at each end with upwardly and laterally turned crank-arms $b$, which serve as journals for the wheels. By turning the shaft in either direction, so as to bring the crank-arms more or less out of the vertical position, the adjustment is effected; but the adjustment of the shaft may be effected by a lever or in any other suitable manner. The axle is shown as being held in the proper adjustment by means of the locking device $d$.

This device comprises arcuate rods secured to the platform at each side. Secured to each crank portion of the axle are double loops, which engage and slide on said arcuate rods, working sufficiently tight thereon to hold the axle at the desired adjustment.

The frame or platform is reduced in width at the front portion and carries at each edge a cutter-blade C, (shown in the drawings as of curved form,) although straight cutters may be employed.

D D' are small cutters or hook-like knives secured to the platform at the rear end of the cutters C and standing at an angle thereto. These cutters are for the purpose of gathering in scattering stalks outside the rows or leaning stalks, and are arranged slightly above the main cutters, in order that leaves and other rubbish accumulating on the cutters may pass off without obstructing the action. The forward wheel $a'$ has bearings between the arms of the bifurcated swivel pin or post F, which is hung in an upwardly and forwardly extending arm G at the front of the platform or frame. To the upper ends of the posts are secured the thills or shafts H. This arm G is adjustable up and down upon the post to permit the adjustment of the forward end of the frame, and this may be effected by the key or pin $f$, as shown, or by a set collar and screw, or by a lever or other suitable means. The pivotal movement of the post is limited by the stop pin or bolt $g$, carried by the post and engaging at the limit of its movement the bracket $g'$ on the arm G, in which the post is hung, or other suitable stop may be employed.

K is a rack for holding the corn or stalks, pivoted to the frame or platform and adjustable in height and position by means of the supporting-arms $e$, hinged to the platform and having the series of pins or lugs, on which the rack rests. The rack K comprises the forwardly and downwardly extending arms, which are pivoted at their lower ends to the platform and united by the horizontal arm K, forming the support proper and which engages the lugs or pins on the arms $e$.

Having described this invention, what I claim as new, and desire to secure by Letters Patent, is—

1. The corn-harvester having a platform carrying cutters at its forward lateral portions and adjustably supported at its forward end upon a caster-wheel, a rear axle having bearings on the under side of said platform and formed at each end with laterally-turned crank-arms, serving as journals for the wheels, double loops carried by said arms, and arcuate rods secured to each side of the platform and engaged by said loops, whereby the axle is held in different adjustment, substantially as specified.

2. The corn-harvester having the rack supported on its platform, said rack comprising the arms pivoted at their lower forward ends to the platform and the horizontal arm portion adapted to be supported by engagement with any one of a series of lugs or pins on arms hinged to the rear of the platform, substantially as specified.

In testimony whereof I affix my signature in presence of two witnesses.

AMOS B. CLIPPINGER.

Witnesses:
EDW. W. CLARK,
P. H. HYBSKMANN.